(12) United States Patent
Cheng et al.

(10) Patent No.: US 9,827,933 B1
(45) Date of Patent: Nov. 28, 2017

(54) ENERGY ABSORBER WITH FIXED ANGLED FINS

(71) Applicant: Ford Global Technologies, LLC, Dearborn, MI (US)

(72) Inventors: James Chih Cheng, Troy, MI (US); Srinivasan Sundararajan, Ann Arbor, MI (US); S. M. Iskander Farooq, Novi, MI (US); Nirmal Muralidharan, Birmingham, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/159,758

(22) Filed: May 19, 2016

(51) Int. Cl.
*B60R 19/18* (2006.01)
*B60R 19/02* (2006.01)

(52) U.S. Cl.
CPC ............ *B60R 19/18* (2013.01); *B60R 19/023* (2013.01); *B60R 2019/1893* (2013.01)

(58) Field of Classification Search
CPC ....... B60R 19/02; B60R 19/023; B60R 19/03; B60R 19/18
USPC .................. 293/110, 120, 121, 133
See application file for complete search history.

(56) References Cited

U.S. PATENT DOCUMENTS

| | | | |
|---|---|---|---|
| 4,061,384 A | 12/1977 | Montgomery et al. | |
| 6,443,511 B2 | 9/2002 | Braun | |
| 6,663,150 B1 | 12/2003 | Evans | |
| 7,004,519 B2 * | 2/2006 | Roussel | B60R 19/18 293/120 |
| 7,044,515 B2 | 5/2006 | Mooijman et al. | |
| 8,056,964 B2 | 11/2011 | Schäfer | |
| 9,067,552 B1 | 6/2015 | Cheng et al. | |
| 2003/0020291 A1 * | 1/2003 | Roussel | B60R 19/18 293/120 |
| 2010/0013250 A1 * | 1/2010 | Suzuki | B60R 19/18 293/132 |
| 2016/0046249 A1 | 2/2016 | Farooq et al. | |

FOREIGN PATENT DOCUMENTS

| | | |
|---|---|---|
| CN | 102837655 A | 12/2012 |
| DE | 4119640 A1 | 12/1992 |
| DE | 10253270 A1 | 6/2004 |
| DE | 102004021800 A1 | 12/2005 |
| EP | 1878621 A1 | 1/2008 |

OTHER PUBLICATIONS

UKIPO Search Report for Application No. GB1707446.9 dated Oct. 5, 2017 (3 pages).

* cited by examiner

*Primary Examiner* — Jason S Daniels

(74) *Attorney, Agent, or Firm* — Frank A. MacKenzie; Bejin Bieneman PLC

(57) ABSTRACT

An energy absorbing system includes a carrier having a wall extending along a longitudinal axis. The energy absorber has a first leg and a second leg extending in a first direction away from the wall. A plurality of fins are fixed to and extend from the wall in the first direction, at approximately 60 to 65 degrees relative to the wall.

18 Claims, 7 Drawing Sheets

ENERGY ABSORBER WITH FIXED ANGLED FINS

BACKGROUND

Bumper assemblies for vehicles may have a stiffness determined by the material and structure of the assembly. The desired stiffness of the bumper assembly may be different depending on vehicle speed. For example, at a low vehicle speed, a higher stiffness may be desired to prevent damage to the vehicle. At a high vehicle speed, a lower stiffness may be desired to absorb energy during a pedestrian impact.

Vehicle research organizations release test protocols and standards for vehicles directed to specific outcomes. For example, the National Highway Traffic Safety Administration (NHTSA) releases the Federal Motor Vehicle Safety Standards (FMVSS), including Part 581, which describes impact test protocols for low speed damageability ("LSD") of vehicle bumper systems. The test measures damage to a vehicle at low speeds. As another example, the Euro New Car Assessment Program (NCAP) releases Global Technical Regulations (GTR), including GTR 9, which measures pedestrian protection. Specifically, the test measures impact on legs of a pedestrian during a front-end vehicle impact, e.g., at speeds greater than 30 KPH. The requirements for LSD and pedestrian protection may result in competing, and counteractive, design concerns.

There remains an opportunity to design a vehicle bumper assembly that accounts for both low speed damageability and pedestrian impact.

DETAILED DESCRIPTION

Figure 1:
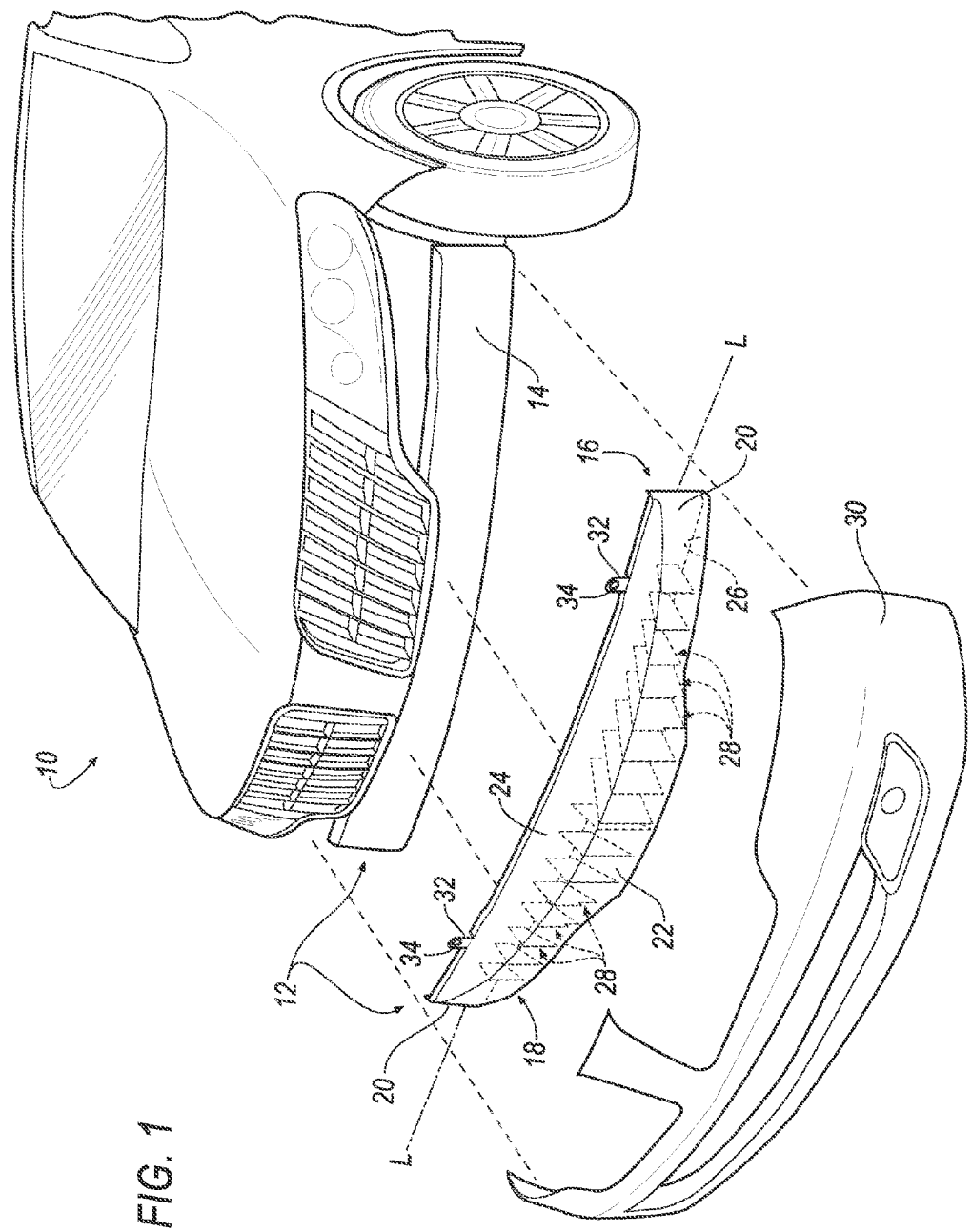
FIG. 1 is a perspective view of a vehicle with a bumper beam, with an energy absorber and a fascia exploded from the rest of the vehicle.

With reference to the Figures, wherein like numerals indicate like parts throughout the several views, a bumper assembly 12 for a vehicle 10 includes a bumper beam 14 and an energy absorber 16. The energy absorber 16 is mounted to the bumper beam 14. As shown in FIG. 1, the energy absorber 16 is shown exploded from the rest of the vehicle 10, including the bumper beam 14. A fascia 30, also shown exploded from the rest of the vehicle in FIG. 1, may cover the bumper assembly 12.

The energy absorber 16 includes a carrier 18 and fins 28. As shown in FIG. 1, the energy absorber 16 extends along a longitudinal axis L, with two ends 20 spaced from each other along the longitudinal axis L. The carrier 18 includes a wall 22 extending along the longitudinal axis L, and may include a first leg 24 and a second leg 26 spaced from each other and extending from the wall 22 in a first direction. The fins 28 may be fixed to the wall 22 and spaced from each other along the longitudinal axis L of the wall 22. The fins 28 may be disposed between the first leg 24 and the second leg 26. Each fin 28 extends from the wall 22 in the first direction at a positive angle A1 and/or a negative angle A2 between approximately 60-65 degrees relative to the wall 22.

When the energy absorber 16 is mounted to the bumper beam 14 of the vehicle 10, the energy absorber 16 extends between the bumper beam 14 and the fascia 30, and the fins 28 extend from the wall 22 toward the bumper beam 14. As set forth further below, the extension of the fins 28 from the wall at the positive angle A1 and/or the negative angle A2 between approximately 60-65 degrees relative to the wall 22 encourages the fins 28 to transfer force from the fascia 30 to the bumper beam 14 with no deformation, and/or minimal deformation, of the fins 28 to reinforce the fascia 30 of the vehicle 10 during a low-speed damageability test, such as FMVSS Part 581. In addition, the extension of the fins 28 from the wall at the positive angle A1 and/or the negative angle A2 between approximately 60-65 degrees relative to the wall 22 encourages the fins to deform and/or break away from the wall 22 to absorb energy during a pedestrian impact test, such as Euro NCAP or GTR 9, which allows the fascia 30 to deform and absorb energy.

The bumper assembly 12 in FIG. 1 is shown on a front end of the vehicle 10. Additionally or alternatively, the bumper assembly 12 may also be affixed to a rear end of the vehicle 10. The vehicle 10 may be of any type of passenger or commercial vehicle such as a car, a truck, a sport utility vehicle, a taxi, a bus, etc.

The bumper beam 14 may be supported on a frame (not shown) of the vehicle 10 in any suitable way. For example, crush cans (not shown) may be mounted to the frame of the vehicle 10 at a first end of the crush cans, with a second end of the crush cans connected to the bumper beam 14. Alternatively, the bumper beam 14 may be mounted directly to the frame of the vehicle 10 in any suitable way.

As shown in FIGS. 1, 4, 6 and 7, the bumper beam 14 may be curvilinear to a tangent at a longitudinal center of the bumper beam 14. The bumper beam 14 may deform during frontal impact. Alternatively, the bumper beam 14 may be configured to remain rigid during frontal impact. The bumper beam 14 may be formed of metal, such as steel or aluminum.

With continued reference to FIG. 1, the fascia 30 may cover the bumper assembly 12, including the energy absorber 16 and the bumper beam 14. The fascia 30 may provide an aesthetic appearance to the vehicle 10, among other things.

The fascia 30 may be affixed to the energy absorber 16 in any suitable manner. For example, the fascia 30 may be affixed to the wall 22 of the carrier 18 using low-density foam or the like to allow the fascia 30 to maintain a desired shape. Alternatively or additionally, fasteners of any suitable type may affix the fascia 30 to the energy absorber 16, or to other structures of the vehicle 10, such as the frame.

During a vehicle impact, the fascia 30 may contact an object, absorbing energy from the object. The fascia 30 may be flexible and/or brittle relative to the bumper assembly 12.

The fascia 30 may be constructed of any suitable material, e.g., a metal, a polymer (e.g., a plastic), a composite, and the like.

As discussed above, the energy absorber 16 extends along the longitudinal axis L, with the two ends 20 spaced from each other along the longitudinal axis L. The carrier 18, including the wall 22, the first leg 24 and the second leg 26, may be curvilinear to a tangent at a longitudinal center of the carrier 18, as shown in FIGS. 1-4. The first leg 24 and the second leg 26 may be shaped to match a shape of the bumper beam 14. For example, the first leg 24 and the second leg 26 of the carrier 18 may extend along an arc that is substantially the same as an arc of the bumper beam 14. In this way, the first leg 24 and second leg 26 of the carrier 18 may abut the bumper beam 14 along a length of the first leg 24 and second leg 26 between the two ends 20 of the energy absorber 16.

With continued reference to FIGS. 1-4, the wall 22 of the carrier 18 may be shaped to match a shape of the fascia 30. For example, the wall 22 of the carrier 18 may extend along an arc that is the same as an arc of the first leg 24 and/or the second leg 26. In that case, the wall 22 may abut the fascia 30 along a length of the wall 18 between the two ends 20 of the energy absorber 16.

Figure 2:
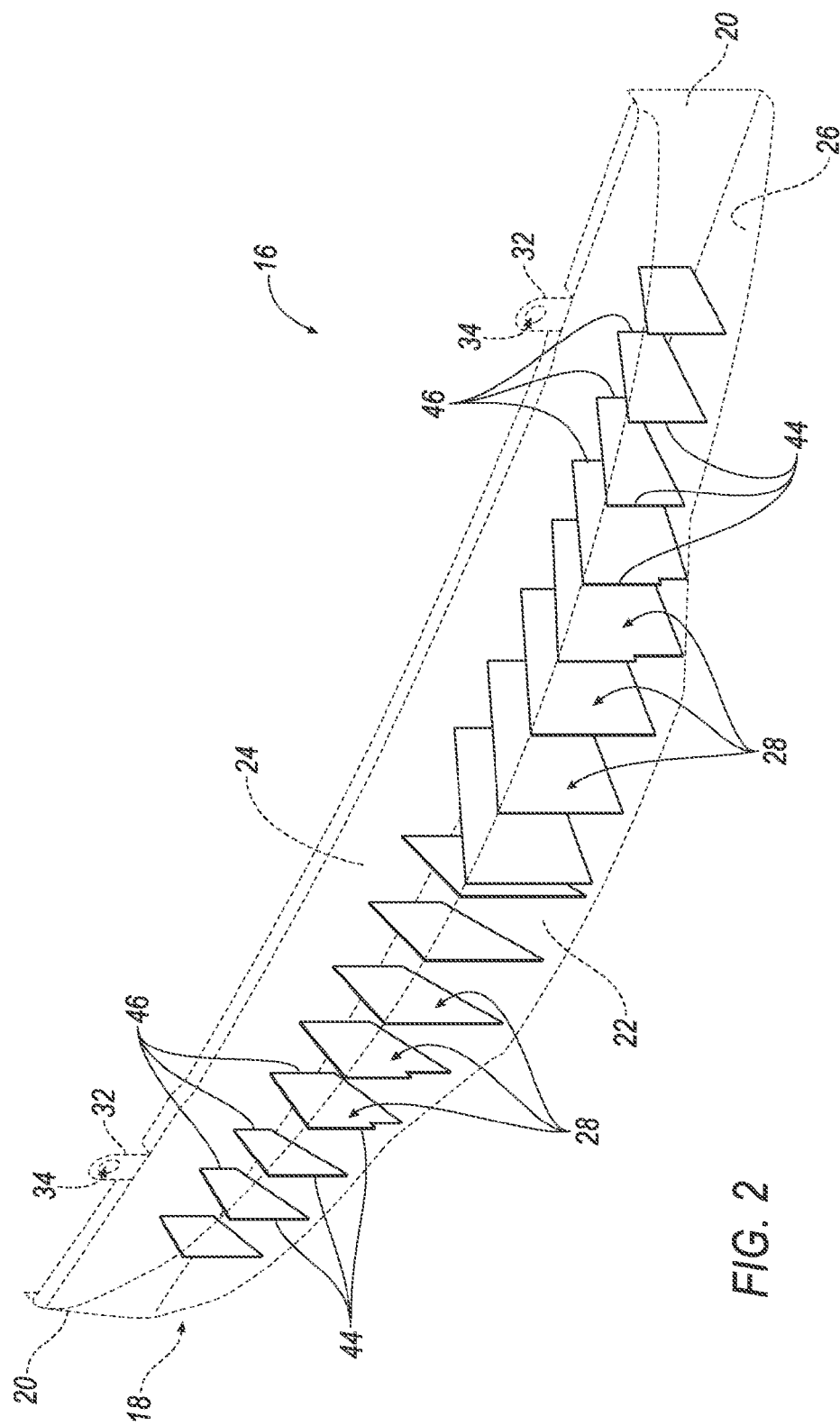
FIG. 2 is a perspective view of the energy absorber of FIG. 1, with a carrier of the energy absorber shown in hidden lines.
Figure 5:
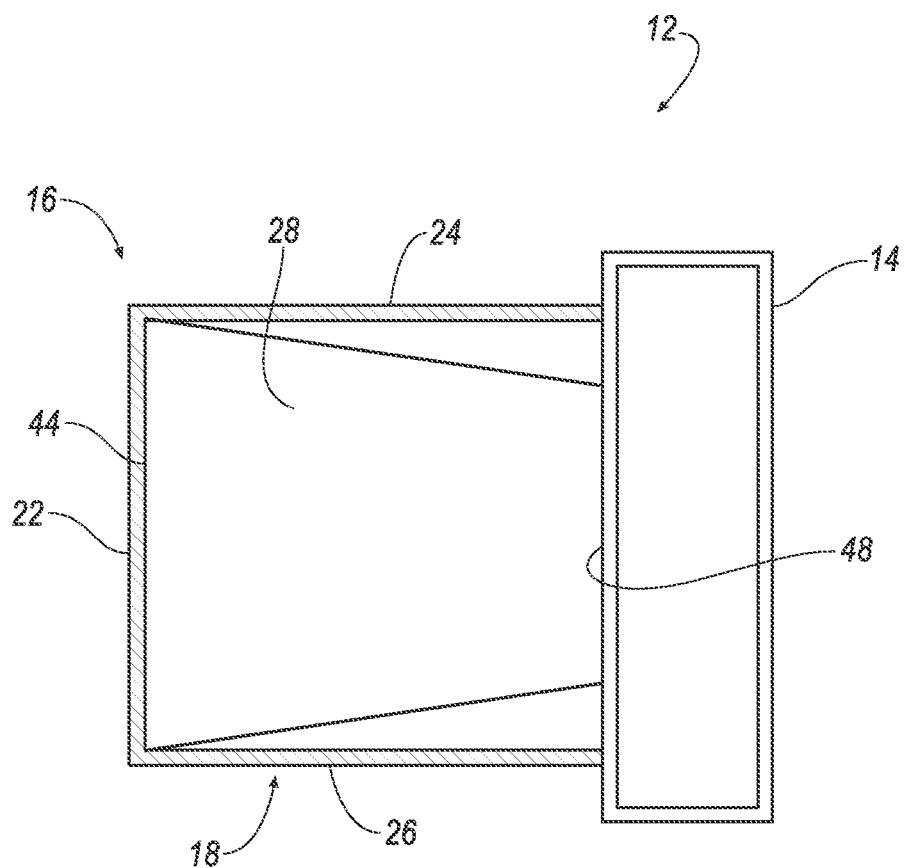
FIG. 5 is a cross-sectional view of a portion of the energy absorber and bumper beam along line 5 of FIG. 4.

With reference to FIG. 2, as set forth above, the first leg 24 and the second leg 26 may be spaced from each other, and extend from the wall 22 toward the bumper beam 14 in the first direction. The first leg 24 and the second leg 26 may extend from the wall 22 toward the bumper beam 14 in the first direction in parallel to each other, as shown in FIG. 5. Alternatively, the first leg 24 and the second leg 26 may extend from the wall 22 toward the bumper beam 14 in the first direction at a non-parallel angle relative to each other.

The first leg 24 and the second leg 26 may be fixed to the wall 22. The wall 22, the first leg 24, and the second leg 26 may be integral, i.e., formed together simultaneously as a single, continuous unit. For example, the wall 22, the first leg 24, and the second leg 26 may be simultaneously molded together, e.g., by injection molding. Alternatively, the wall 22, the first leg 24, and/or the second leg 26 may be separately formed, and subsequently fixed together in any suitable way, e.g., using adhesives, fasteners, fusing, welding, etc. The wall 22, the first leg 24, and the second leg 26 may be formed from any suitable material including plastic, a composite, etc. The wall 22, the first leg 24, and the second leg 26 may be formed from the same or from dissimilar materials.

Figure 3:
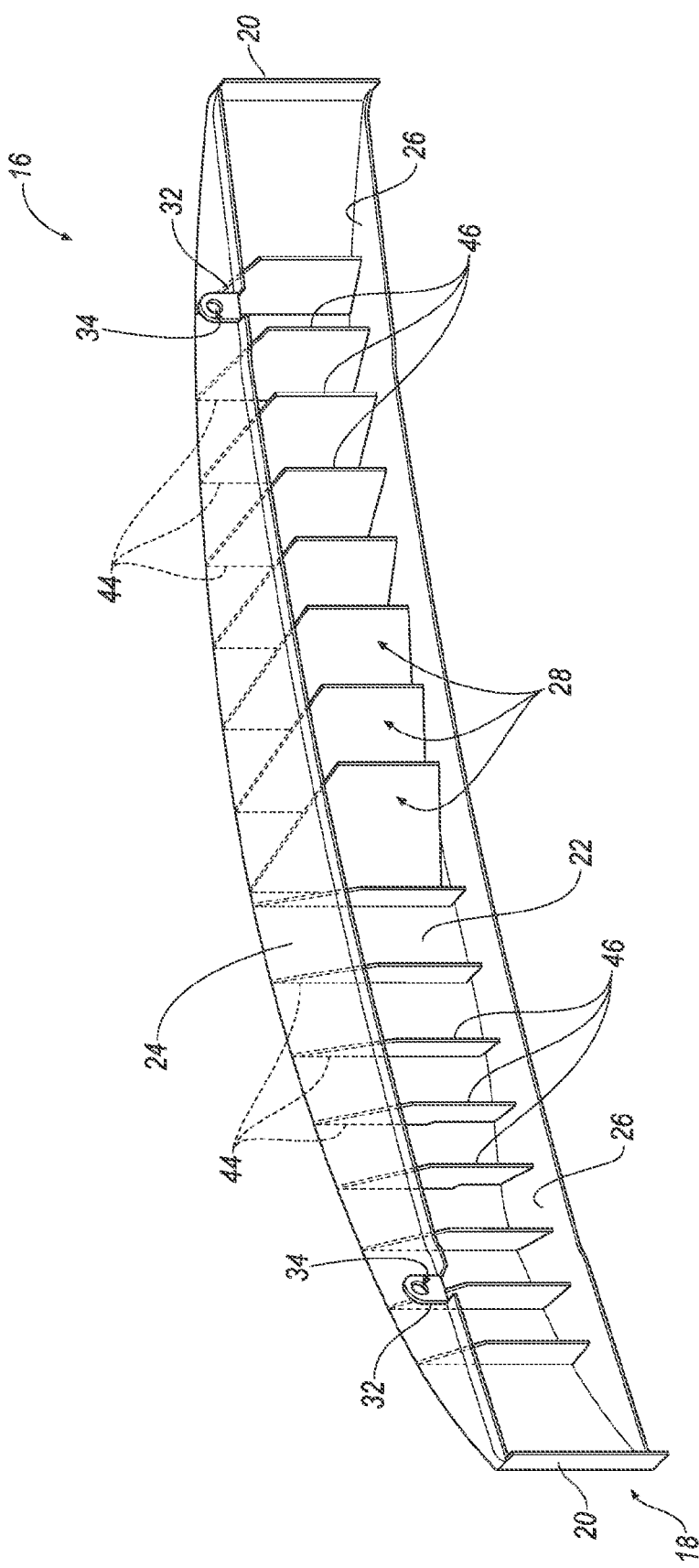
FIG. 3 is another perspective view of the energy absorber of FIG. 1.

As shown in FIGS. 2 and 3, the carrier 18 may include one or more flanges 32 that define openings 34. Fasteners, such as threaded bolts, can extend through the openings 34 into aligned holes (not shown) in, e.g., the bumper beam 14 or the frame, to mount the energy absorber 16 to the vehicle 10. Alternatively or additionally, other suitable materials such as adhesives can also be used to mount the energy absorber 16 to the rest of the vehicle 10.

Figure 4:
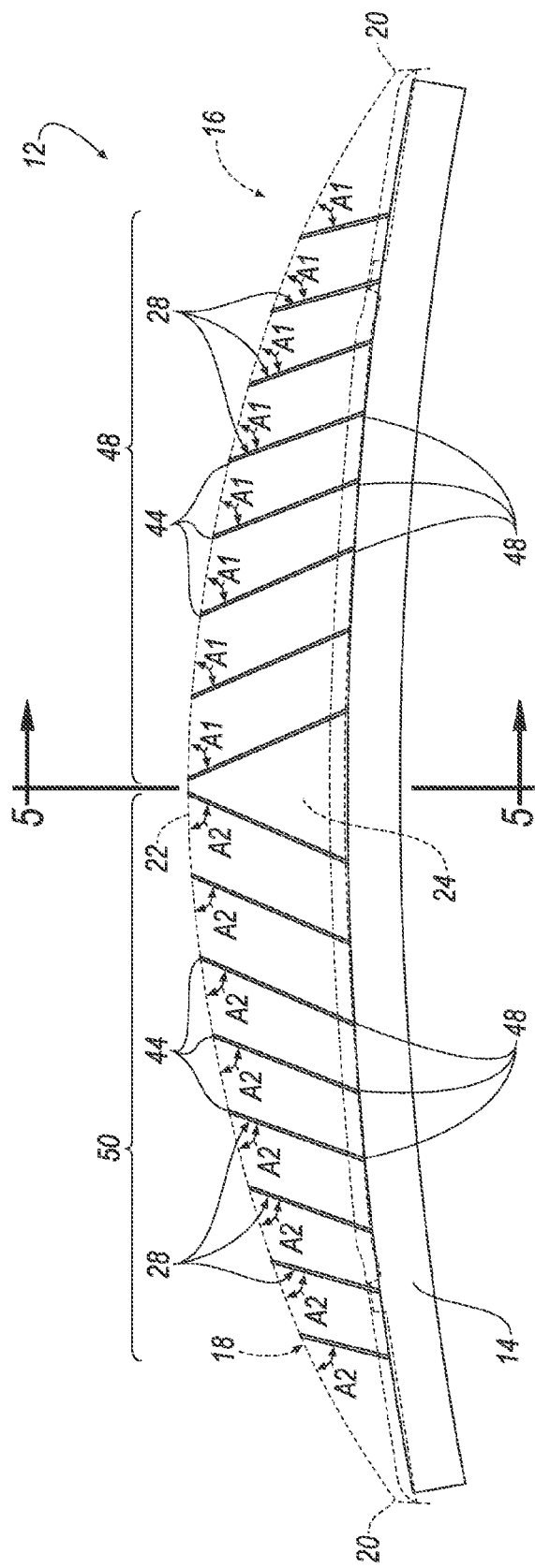
FIG. 4 is a plan view of the energy absorber of FIG. 1, with the carrier shown in hidden lines, and the bumper beam.

The wall 22 of the carrier 18 is in a vehicle-forward direction relative to the bumper beam 14 when, as shown in FIG. 1, the energy absorber 16 is mounted to the front end of the vehicle 10. The fins 28 extend from the wall 22 toward the bumper beam 14 in the first direction. Each fin 28 may extend from a first end 44 fixed to the wall 22 to an exposed end 46. As shown in FIG. 3, the exposed end 46 is open and visible relative to the carrier 18. As shown in FIGS. 4 and 5, the exposed ends 46 may abut the bumper beam 14. In the alternative or in addition to the first ends 44 of the fins 28 being fixed to the wall 22, the first ends 44 may be fixed to the first leg 24 and/or the second leg 26, as set forth below. In other words, the first ends 44 may be spaced from the wall 22, or may be disconnected from and abutting the wall 22.

As shown in FIG. 5, the fins 28 may taper away from the first leg 24 and second leg 26 in the first direction. The fins 28 may be fixed to the first leg 24 and the second leg 26 at an intersection of the wall 22 with the first leg 24 and the second leg 26, respectively. The fins 28 may taper away from the first leg 24 and the second leg 26 from the intersection of the wall 22 with the first leg 24 and the second leg 26, respectively. Alternatively, the fins 28 may be fixed to the first leg 24 and/or the second leg 26 along part or all of the first leg 24 and/or the second leg 26 from the wall to the exposed ends 46.

The fins 28 are spaced from each other along the longitudinal axis L. The fins 28 may be formed of plastic, composites, etc.

The carrier 18 shown in FIGS. 1-4, 6 and 7 includes sixteen fins 28. However, the carrier 18 may include any suitable number of fins 28. The number of fins 28 in the energy absorber 16 may vary depending on a number of factors. The factors include the spacing between the fins 28, the materials from which the fins 28 are formed, and a longitudinal length of the energy absorber 16, among other things.

The fins 28 may be integral with the wall 22, the first leg 24, and/or the second leg 26, i.e., formed together simultaneously as a single, continuous unit. For example, the fins 28 may be simultaneously molded with the wall 22, the first leg 24, and/or the second leg 26, e.g., by injection molding. Alternatively, the fins 28 may be separately formed from the wall 22, the first leg 24, and/or the second leg 26, and subsequently fixed to the wall 22, the first leg 24, and/or the second leg 26 in any suitable way, e.g., using adhesives, fasteners, fusing, welding, etc. The fins 28 may be formed from any suitable material including plastic, a composite, etc. The fins 28 may be formed from the same or from dissimilar materials as the wall 22, the first leg 24 and/or the second leg 26.

As shown in FIG. 4, the energy absorber 16 may include a first plurality 48 of fins 28 and a second plurality 50 of fins 28, i.e., a first bank of fins 28 and a second bank of fins 28. The fins 28 of the first plurality 48 may extend from the wall 22 in the first direction at the angle A1 and the fins 28 of the second plurality 50 may extend from the wall 22 in the first direction at an angle A2. As set forth above, the angle A1 may be between 60-65 degrees. The angle A2 may be between 60-65 degrees measured from the wall 22 in an opposite direction than A1. In other words, the angle A1 of the fins 28 of the first plurality 48 may be measured from the wall 22 in the positive direction and the second angle A2 of the fins 28 of the second plurality 50 may be measured from the wall 22 in the negative direction.

The first plurality 48 and the second plurality 50 of fins 28 may meet at a center of the carrier 18. The fins 28 of the first plurality 48 and the fins 28 of the second plurality 50 may angle from the wall 22 away from center of the carrier 18.

Figure 6:
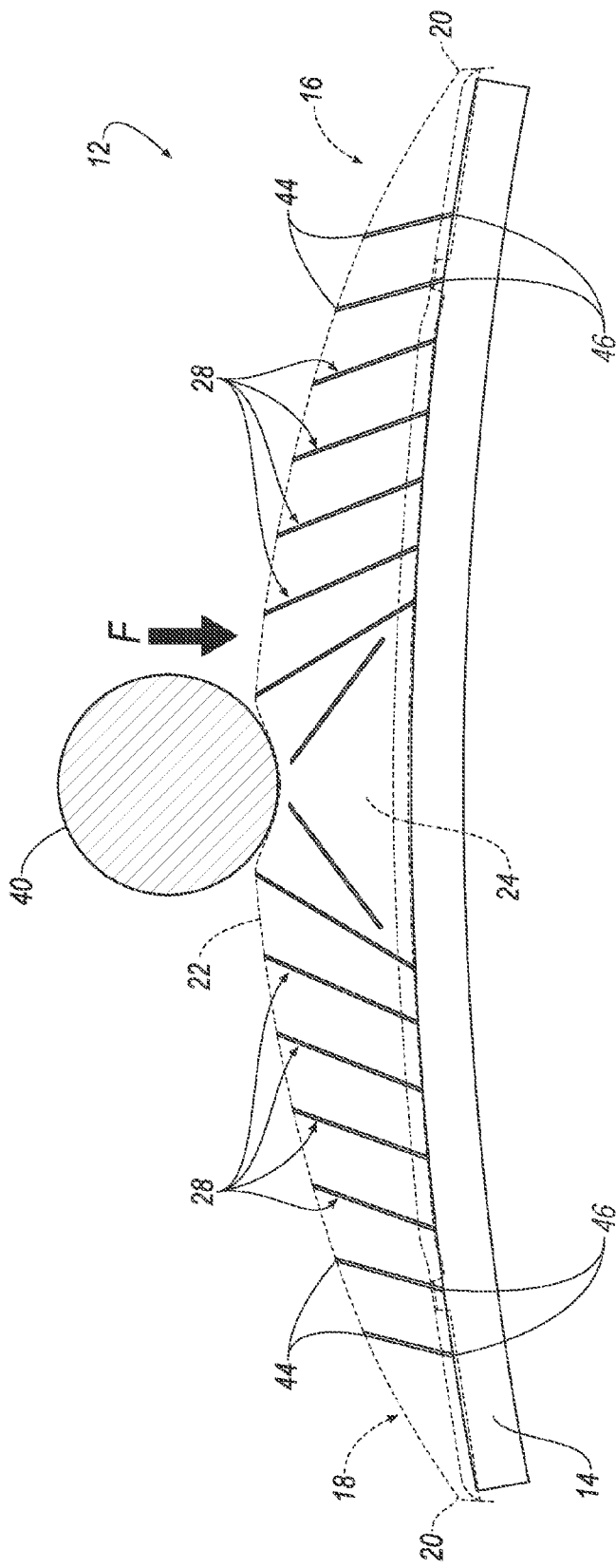
FIG. 6 is a plan view of the energy absorber of FIG. 1, with the carrier shown in hidden lines, and the bumper beam, showing an impact with a first object in a pedestrian protection test.

With reference to FIG. 6, a legform impactor 40 is shown during impact (identified as "F") with the energy absorber 16 and the bumper beam 14 in a pedestrian protection test, e.g., Euro NCAP or GTR 9. In the pedestrian impact test, the legform impactor 40 may impact the bumper assembly 12 at a speed greater than 30 kph. Due to the relatively high speed of the pedestrian impact test, and the relatively small diameter of the legform impactor 40, the fins 28 may break away from the wall 22 of the energy absorber 16, allowing the wall 22, the first leg 24 and the second leg 26 of the carrier 18, and the fascia 30 to deform. In this way, the energy absorber 16 may provide a lower stiffness, and absorb more energy from the impact. The fins 28 break away from the wall 22 in these conditions due to the extension of the fins 28 relative to the wall 22 at between 60-65 degrees.

Figure 7:
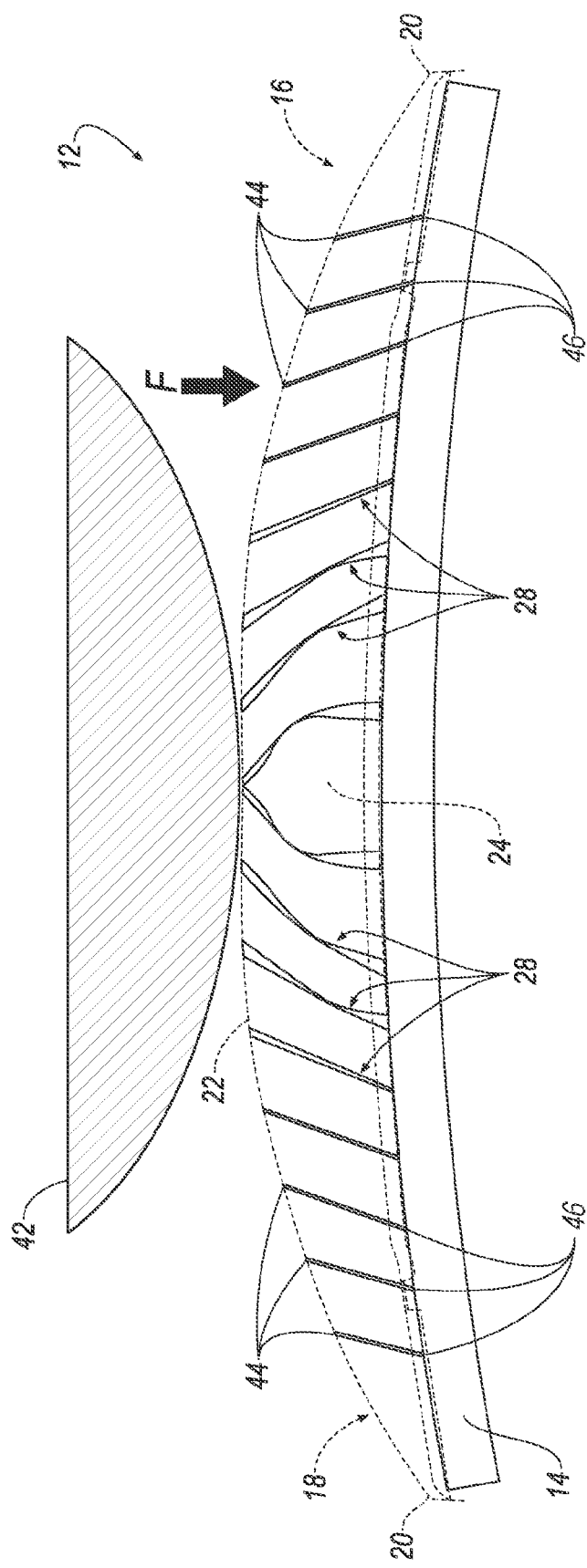
FIG. 7 is a plan view of the energy absorber of FIG. 1, with the carrier shown in hidden lines and the bumper beam, showing an impact with a second object in a low speed damageability test.

In FIG. 7, a bumper impact test device 42 is shown during impact (identified as "F") with the energy absorber 16 during an LSD test, such as FMVSS Part 581. In such an LSD test, the bumper impact test device 42 may impact the bumper assembly 12 at a lower speed than the pedestrian impact test, e.g., 4 kph. The bumper impact test device 42 has a larger diameter than the legform impactor 40. Thus, the bumper impact test device 42 applies force to a larger number of the fins 28, i.e., the force of the bumper impact test device 42 is distributed across a greater number of fins 28 in comparison to the legform impactor 40. Due to the relatively low speed of the LDS test, and the relatively large diameter of the bumper impact test device 42, the fins 28 may bend and/or otherwise deform rather than break away from the wall 22, providing the energy absorber 16 with a higher stiffness relative to impacts at higher speeds. In other words, the fins 28 reinforce the fascia 30 during the LSD test. The fins 28 bend and/or deform in these conditions due to the extension of the fins 28 relative to the wall 22 at between 60-65 degrees. Thus, the extension of the fins 28 relative to the wall 22 at between 60-65 degrees both 1) encourages the fins 28 to break when impacted by the relatively small diameter legform impactor 40 at relatively high speeds to encourage the bumper assembly 12 to deform and absorb energy, and 2) encourages the fins 28 to bend when impacted by the relatively large diameter bumper impact test device 42 at relatively low speeds to encourage the bumper assembly 12 to resist deformation to prevent or limit damage to the fascia 30.

As used herein, the adverb "substantially" modifying an adjective means that a shape, structure, measurement, etc. may deviate from an exact described geometry, distance, measurement, etc., because of imperfections in materials, machining, manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A bumper assembly, comprising:
a bumper beam extending along a longitudinal axis;
a carrier mounted to the bumper beam, the carrier having a wall spaced from the bumper beam and extending along the longitudinal axis;
a plurality of fins fixed to the carrier and spaced from each other along the longitudinal axis;
wherein each fin extends from the wall toward the bumper beam at an angle between approximately 60-65 degrees relative to the wall; and
the carrier having a first leg and a second leg spaced from each other and each extending from the wall toward the bumper beam, the fins disposed between the first leg and the second leg.

2. The bumper assembly of claim 1, wherein the fins are fixed to the wall.

3. The bumper assembly of claim 1, wherein the fins taper away from the first leg and the second leg in a direction toward the bumper beam.

4. The bumper assembly of claim 1, wherein the fins are fixed to the first leg and to second leg at the wall.

5. The bumper assembly of claim 4, wherein the fins taper away from the first leg and the second leg in a direction toward the bumper beam.

6. The bumper assembly of claim 1, wherein the wall, the first leg, the second leg, and the fins are integral with each other.

7. The bumper assembly of claim 1, wherein the wall and the fins are integral to each other.

8. The bumper assembly of claim 1, wherein the first leg, the second leg, and the fins abut the bumper beam.

9. The bumper assembly of claim 1, wherein the fins abut the bumper beam.

10. The bumper assembly of claim 1, further comprising a second plurality of fins fixed to the wall and spaced from each other along the longitudinal axis, and extending from the wall toward the bumper beam at a second angle between approximately 60-65 degrees relative to the wall, the angle of the plurality of fins being measured in a positive direction and the second angle of the second plurality of fins being measured in a negative direction.

11. The bumper assembly of claim 1, further comprising a fascia, with the carrier between the fascia and the bumper beam.

12. An energy absorber, comprising:
a carrier including a wall extending along a longitudinal axis and having a first leg and a second leg spaced from each other and extending in a first direction away from the wall;
a plurality of fins spaced from each other along the longitudinal axis, each fin being fixed to the carrier, the fins disposed between the first leg and the second leg;
wherein each fin extends from the wall in the first direction at between approximately 60-65 degrees relative to the wall.

13. The energy absorber of claim 12, wherein the fins are fixed to the wall.

14. The energy absorber of claim 12, wherein the fins are fixed to the first leg and to the second leg at the wall.

15. The energy absorber of claim 14, wherein the fins taper away from the first leg and the second leg in the first direction.

16. The energy absorber of claim 12, wherein the wall, the first leg, the second leg, and the fins are integral with each other.

17. The energy absorber of claim 12, wherein the wall and the fins are integral with each other.

18. The energy absorber of claim 12, further comprising a second plurality of fins fixed to the wall and spaced from each other along the longitudinal axis, and extending from the wall in the first direction at a second angle between approximately 60-65 degrees relative to the wall, the angle of the plurality of fins being measured in a positive direction and the second angle of the second plurality of fins being measured in a negative direction.

* * * * *